US010379369B2

(12) United States Patent
Le et al.

(10) Patent No.: US 10,379,369 B2
(45) Date of Patent: Aug. 13, 2019

(54) INTEGRATED OPTICAL COMPONENT AND METHOD OF MAKING

(71) Applicant: 3M INNOVATIVE PROPERTIES COMPANY, St. Paul, MN (US)

(72) Inventors: John D. Le, Woodbury, MN (US); Andrew J. Ouderkirk, St. Paul, MN (US); Joseph C. Carls, Austin, TX (US); Cameron T. Murray, Stillwater, MN (US); Richard J. Ferguson, Eau Claire, WI (US); Cory C. Barum, Burnsville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/002,382

(22) Filed: Jun. 7, 2018

(65) Prior Publication Data
US 2018/0284471 A1 Oct. 4, 2018

Related U.S. Application Data

(62) Division of application No. 15/102,765, filed as application No. PCT/US2014/069957 on Dec. 11, 2014, now Pat. No. 10,018,850.

(60) Provisional application No. 61/919,867, filed on Dec. 23, 2013.

(51) Int. Cl.
*G02B 27/28* (2006.01)
*G02F 1/1335* (2006.01)

(52) U.S. Cl.
CPC ..... *G02B 27/285* (2013.01); *G02F 1/133512* (2013.01); *G02F 1/133536* (2013.01); *G02F 2001/13355* (2013.01)

(58) Field of Classification Search
CPC ............. G02B 27/285; G02F 1/133512; G02F 1/133536; G02F 2001/13355
USPC ............................... 359/485.06, 900; 349/96
See application file for complete search history.

(56) References Cited

U.S. PATENT DOCUMENTS

| 5,528,720 | A | * | 6/1996 | Winston | ................... | F21V 5/02 |
| | | | | | | 385/129 |
| 6,002,829 | A | * | 12/1999 | Winston | ............... | G02B 6/0038 |
| | | | | | | 385/146 |
| 6,028,708 | A | | 2/2000 | Gramann et al. | | |

(Continued)

FOREIGN PATENT DOCUMENTS

CN 1670550 9/2005
CN 201004142 Y 1/2008

(Continued)

OTHER PUBLICATIONS

PCT International Search Report from PCT/US2014/069657 dated May 11, 2015, 6 pages.

*Primary Examiner* — Frank G Font
(74) *Attorney, Agent, or Firm* — Jonathan L. Tolstedt

(57) ABSTRACT

The present disclosure provides an integrated optical component array and method of making an integrated optical component array useful for projection devices or other optical devices. The integrated optical component array can be a PBS array fabricated such that the individual PBS cubes having several elements can be assembled in a massively parallel manner and then singulated as individual optical components, and can result in a large reduction in manufacturing cost.

16 Claims, 10 Drawing Sheets

(56) References Cited

U.S. PATENT DOCUMENTS

| | | | |
|---|---|---|---|
| 6,278,552 B1* | 8/2001 | Ishihara | G02B 5/1833 |
| | | | 348/E9.027 |
| 6,811,274 B2 | 11/2004 | Olczak | |
| 9,841,605 B2* | 12/2017 | Carls | G02B 27/141 |
| 2002/0096250 A1 | 7/2002 | Murata | |
| 2005/0168697 A1 | 8/2005 | Bruzzone et al. | |
| 2005/0265683 A1 | 12/2005 | Cianciotto et al. | |
| 2006/0291054 A1 | 12/2006 | Tomoguchi | |
| 2007/0121034 A1 | 5/2007 | Ouderkirk et al. | |
| 2007/0211339 A1 | 9/2007 | Furusato | |
| 2008/0030656 A1 | 2/2008 | Watson et al. | |
| 2008/0151372 A1 | 6/2008 | Ouderkirk et al. | |
| 2010/0128347 A1 | 5/2010 | Huang | |
| 2011/0109966 A1 | 5/2011 | Yu et al. | |
| 2012/0140184 A1 | 6/2012 | Bruzzone | |
| 2013/0120961 A1 | 5/2013 | Wong et al. | |
| 2015/0024149 A1* | 1/2015 | Watanabe | G02B 5/3033 |
| | | | 428/1.31 |
| 2015/0098128 A1* | 4/2015 | Carls | B26D 3/065 |
| | | | 359/485.06 |

FOREIGN PATENT DOCUMENTS

| | | |
|---|---|---|
| EP | 0 359 658 | 3/1990 |
| EP | 1 180 711 | 2/2002 |
| JP | 2000-002808 | 1/2000 |
| JP | 2007-279692 | 10/2007 |
| JP | 2008-145481 | 6/2008 |
| JP | 2010-152044 | 7/2010 |
| WO | WO 2006/049324 | 5/2006 |
| WO | WO 2007/016015 | 2/2007 |
| WO | WO 2014/004228 | 1/2014 |

* cited by examiner

INTEGRATED OPTICAL COMPONENT AND METHOD OF MAKING

BACKGROUND

The operation of Liquid Crystal on Silicon (LCOS) based projectors require the use of polarized light. Such projectors can require the use of polarizing beam splitters (PBS) in order to operate efficiently. These specialized optical components are typically assembled by hand. Because of this, the labor content of these devices is relatively high and the yield is relatively low. These two factors generally can lead to a high cost for the component. In addition, the hand assembly can limit the PBS to illumination applications. The high cost of the components is ironic because the LCOS imagers are relatively inexpensive, and LCOS based systems are purported to be low-cost systems. This can lead to the situation where the high cost of the component offsets the low-cost of the imager.

SUMMARY

The present disclosure provides an integrated optical component array and method of making an integrated optical component array useful for projection devices or other optical devices. The integrated optical component array can be a PBS array fabricated such that the individual PBS cubes having several elements can be assembled in a massively parallel manner and then singulated as individual optical components, and can result in a large reduction in manufacturing cost.

In one aspect, the present disclosure provides an integrated optical component that includes a support having a planar first surface and an opposing second surface, the opposing second surface including a plurality of stair steps, each of the plurality of stair steps having a tread and a riser that intersect to form a hinge proximate the planar first surface; and a polarizing beam splitter (PBS) cube disposed on each of the plurality of stair steps and integral with the support. The PBS cube further includes a first prism having a first prism surface adjacent the riser and a second prism surface adjacent the stair step; a second prism having a third prism surface opposite the first surface and a fourth prism surface opposite the second surface; and a reflective polarizer disposed on a diagonal surface between the first prism and the second prism, the reflective polarizer being parallel to the planar first surface of the support, wherein the first prism surface is separated by a first trough from the riser, and the PBS cube includes opposing end faces orthogonal to the tread and to the riser.

In another aspect, the present disclosure provides an integrated optical component that includes a support having a planar first surface and an opposing second surface, the opposing second surface including a plurality of stair steps, each of the plurality of stair steps having a tread and a riser that intersect to form a hinge proximate the planar first surface; and a plurality of polarizing beam splitter (PBS) cubes integral with the support and disposed in a line on each of the plurality of stair steps. Each of the plurality of PBS cubes further include a first prism having a first prism surface adjacent the riser and a second prism surface adjacent the stair step; a second prism having a third prism surface opposite the first surface and a fourth prism surface opposite the second surface; a reflective polarizer disposed on a diagonal surface between the first prism and the second prism, the reflective polarizer being parallel to the planar first surface of the support; and opposing end faces, each opposing end face orthogonal to the reflective polarizer, wherein each first prism surface is separated by a first trough from the riser, and a second trough separates adjacent PBS cubes on the riser.

In yet another aspect, the present disclosure provides an integrated optical component that includes a support having a planar first surface and an opposing second surface including a stair step having a tread and a riser; and a plurality of polarizing beam splitter (PBS) cubes integral with the support and disposed in a line on the stair step. Each of the plurality of PBS cubes further includes a first prism having a first prism surface adjacent the riser and a second prism surface adjacent the stair step; a second prism having a third prism surface opposite the first surface and a fourth prism surface opposite the second surface; a reflective polarizer disposed on a diagonal surface between the first prism and the second prism, the reflective polarizer being parallel to the planar first surface of the support; and opposing end faces, each opposing end face orthogonal to the reflective polarizer, wherein each first prism surface is separated by a first trough from the riser, and a second trough separates adjacent PBS cubes on the riser.

In yet another aspect, the present disclosure provides a method of making an optical component that includes laminating a reflective polarizer between a first polymeric plate and a second polymeric plate, the first polymeric plate having a first outer surface and the second polymeric plate having an opposing second outer surface; milling a plurality of parallel first troughs in the second polymeric plate at a 45 degree angle to the reflective polarizer to a first bottom, each parallel first trough separating a stair step riser from a first prism surface of a polarizing beam splitter (PBS) cube; milling a plurality of parallel second troughs perpendicular to the first troughs thereby forming a plurality of stair step treads, each of the stair step treads coplanar with the first bottom and extending from a first riser to an adjacent second riser, wherein each second trough separates end faces of adjacent PBS cubes on the tread, and an intersection of the tread and the riser defines a first hinge proximate the first outer surface; and optionally milling a plurality of parallel third troughs each having a third bottom, each parallel to the first troughs, each of the parallel third troughs being perpendicular to the corresponding stair step riser and forming a flange supporting the PBS cubes, the third bottom separated from the tread by a second hinge. The method further includes milling a plurality of notches parallel to the first troughs, each notch having a first notch surface parallel to the tread and a second notch surface parallel to and extending into the riser, wherein the first notch surface comprises a fourth prism surface opposite the tread and the second notch surface comprises a third prism surface opposite the first prism surface, wherein the milling steps can be performed in any order.

In yet another aspect, the present disclosure provides an optical article that includes a first transparent plate having a first major surface; a second transparent plate having a second major surface; a polymeric multilayer reflective polarizer affixed between the first major surface and the second major surface; and a first undercut trough having first opposing sides and a first bottom, extending through the first transparent plate and the polymeric multilayer reflective polarizer, wherein at least one of the first and second transparent plates exhibit low birefringence.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
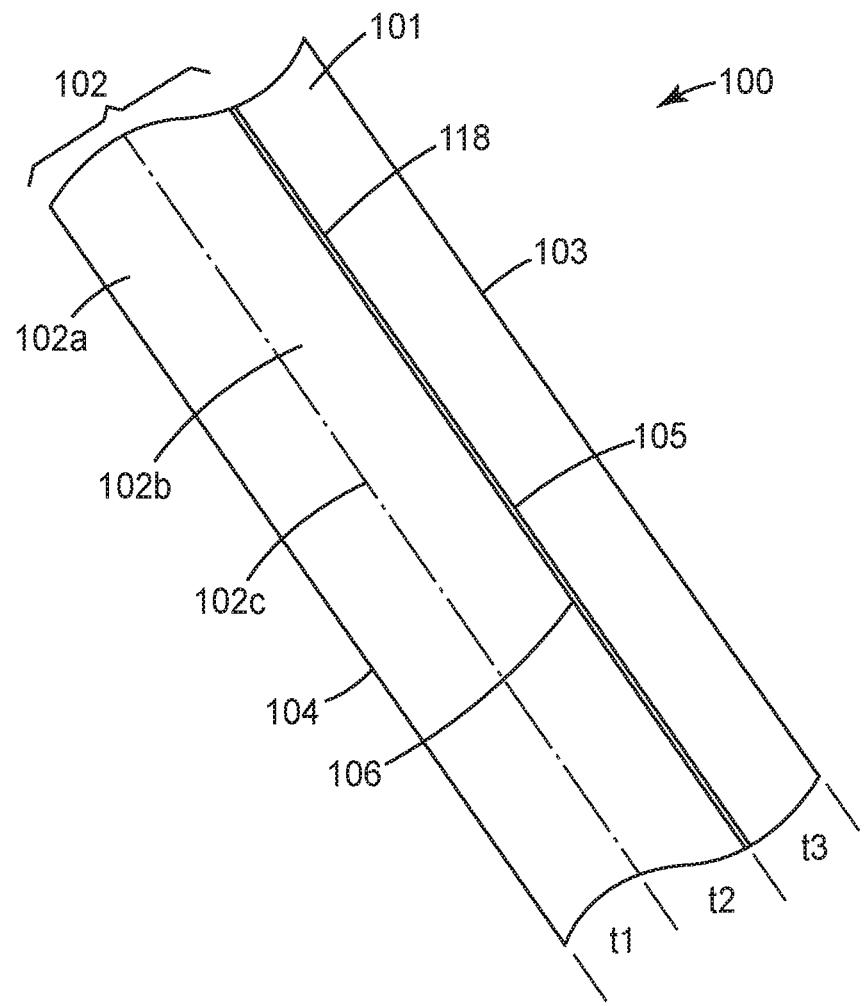
FIG. 1A shows a cross-sectional view of an optical laminate.

The present disclosure provides an integrated optical component array and method of making an integrated optical component array that can include a plurality of optical components, such as polarizing beam splitters (PBSs) useful for projection devices or other optical devices. The optical component array can be fabricated such that individual optical components having several elements can be assembled in a massively parallel fashion and then singulated (i.e., separated from each other) as individual optical components. This construction technique opens the possibility for a large reduction in manufacturing cost, and can eliminate much of the hand assembly which can be a significant source of variation in optical components.

One obstacle encountered while manufacturing polarization control components, in particular polymeric polarization control components, is the need to ensure that the components exhibit a low enough level of birefringence. This can be difficult to accomplish in the case of mass-produced injection molded parts, since the residual stress associated with injection molding may frequently lead to high birefringence. However, at least for cost and lifetime reasons, plastic parts are very desirable.

In one aspect, the present disclosure describes an integrated optical component that can be fabricated using especially low birefringent material, such as a heat stabilized acrylic plate that can be prepared by suspending an acrylic plate in a thermal environment that can relieve residual stresses that are incorporated into the plate during fabrication, as described elsewhere. The residual stresses can lead to increased levels of birefringence, and the heat stabilization process can dramatically reduce or eliminate the stresses, resulting in acrylic plates having a retardance of preferably less than 20 nm, more preferably less than 10 nm, most preferably less than 5 nm.

In one particular embodiment, some of the benefits of invention described herein include: elimination of chamfer on the edges of the PBS cube due to direct milling of the cube surfaces; elimination of the need for singulation using lasers and the associated debris generated by the use of lasers; elimination of unpainted/uncoated edges and end faces from the singulation process; establishing a precise and more robust machined aperture without need for exotic special-order machine tooling; enabling a one-step painting/coating process without the need for a secondary touch-up; and enabling a more stable and potentially automated polishing process for the optical surfaces.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Also, for the purposes of the description provided herein, the term "aligned to a desired polarization state" is intended to associate the alignment of the pass axis of an optical element to a desired polarization state of light that passes through the optical element, i.e., a desired polarization state such as s-polarization, p-polarization, right-circular polarization, left-circular polarization, or the like. In one embodiment described herein with reference to the Figures, an optical element such as a polarizer aligned to the first polarization state means the orientation of the polarizer that passes the p-polarization state of light, and reflects or absorbs the second polarization state (in this case the s-polarization state) of light. It is to be understood that the polarizer can instead be aligned to pass the s-polarization state of light, and reflect or absorb the p-polarization state of light, if desired.

One factor that impacts the pocket projector market is the high cost of the projectors, especially if the projectors are battery powered. LCOS based projectors have the potential of being low-cost because the imager can be manufactured using the techniques of semiconductor manufacturing. Being based on polarization switching, these projectors require polarization control components such as polarizing beam splitters (PBS), polarization conversion systems (PCS), and conventional optical components such as color combiners (CC) and tapered light guides. Many of these components are currently assembled by hand and can be quite expensive. The present disclosure provides a path to reduce the cost of these components by as much as an order of magnitude. Such a reduction in cost could make LCOS projectors the clear low-cost winner in the pocket projector marketplace.

In one aspect, the present disclosure provides a contiguous array of optical components and a technique for making them. This technique has the potential to dramatically reduce cost and waste, and also to substantially improve yield. In one particular embodiment, an array of polarizing beam splitters (PBSs) is fabricated through a machining approach, in which a two dimensional array of PBS forms are machined out of an optical laminate. The optical laminate includes a reflective polarizer adhered between two transparent plates. At least one of the transparent plates have a low birefringence, such as a heat stabilized acrylic, and the reflective polarizer can be a polymeric multilayer optical film (MOF), such as Vikuiti™ DBEF reflective polarizer, available from 3M Company.

In order to glue the transparent plate to the MOF, any effective technique may be used. In one particular embodiment, the MOF can be releasably attached onto a flat surface, and the required amount of adhesive placed on top of the MOF, whose extent may be larger than the plate. The transparent plate can then be placed on top of the pool of adhesive causing the adhesive to flow out to the edges of the transparent plate. The adhesive can then be cured or set (e.g., UV or thermal cured). In some cases, a pressure sensitive adhesive (PSA) can be applied to either the MOF or the transparent plate, and then laminated.

After the first transparent plate is adhered to the MOF, the transparent plate and the MOF can be peeled away from the flat surface to which the MOF was releasably attached. This construction can then be placed MOF side up and a second quantity of adhesive can be placed on to the opposite side of the MOF. After this, the second transparent plate can be placed on top of the MOF, and again the adhesive will flow out to the edges, and can then be cured. Alignment features can be provided in each of the transparent plates to permit reliable alignment of the optical laminate during further milling/machining operations. In some cases, more than one transparent plate may be adhered using an optically matched adhesive to either side of the optical laminate, to permit build-up of thickness for either rigidity or sufficient thickness to form larger optical components.

In one particular embodiment, the technique of making the PBS array has a focus on orienting the optical surface or surfaces to be fabricated such that they are planar (either vertical or horizontal) with respect not only to machining to but also to common conventional processes including, for example, optical coating, vacuum coating, antireflective (AR) coating, polishing and the like. In particular, to facilitate machining, the surfaces preferably align to a conventional X, Y, or Z orientation. Alignment to the conventional orientation helps to allow machine operation in precise and smooth linear motion, versus a finite stair-step motion (X-Y translation) if the surface to be machined is positioned at off-angles. This can be particularly useful for machining the aperture, since the crowned aperture design permits precision control on X-Y, while allowing some margin for Z dimension. At the same time, such an orientation allows movement of the reference floor level to outside of active part area.

In one aspect, the present disclosure provides for a process by which individual machined PBS components having multiple functionalities can be formed in a large array before singulation. In one particular embodiment, the individual machined PBS components can include a PBS having selective surfaces coated with an optically black coating; a PBS having a machined and polished aperture feature instead of a printed aperture; AR coating applied on selected surfaces; selective polished faces; and without a chamfered corner. The present disclosure provides for a landing area (i.e., the supporting portion of the array of individual PBS elements) that is outside of active optical component area. The disclosed fabrication of the PBS array may be more synergetic with other processes, including black coating, AR coating, polishing, and singulation, and permits any functional coating process or treatment to be done on each cube in the array of cubes before removing the landing area and singulating into individual cubes.

FIG. 1A shows a cross-sectional view of an optical laminate 100, according to one aspect of the disclosure. Optical laminate 100 includes a first transparent plate 101 having a first thickness t3, a first outer surface 103, and a first inner surface 105; a second transparent plate 102 having a second outer surface 104, and a second inner surface 106; and a substrate 118 affixed between the first transparent plate 101 and the second transparent plate 102. At least one of the first and second transparent plates 101, 102 exhibit low-birefringence. In one particular embodiment, a sufficiently low-birefringent plate may be difficult to fabricate at a sufficient thickness for the optical element to be made, so at least one of the first or second transparent plates 101, 102, can be made thicker by laminating more than one low-birefringent together, as shown in FIG. 1A. As shown in FIG. 1A, second transparent plate 102 can be made thicker by including a first individual transparent plate 102a having a first individual thickness t1 and a second individual transparent plate 102b having a second individual thickness t2, that have been laminated together along a common surface 102c to form the second transparent plate having a combined thickness (t1+t2).

The first and second transparent plates 101, 102, can be any suitable polymer or glass that can be machined, such as visible-light transparent polymers and low birefringent glasses useful for optical components. In some cases, optical quality glass such as those available from Schott Optical Glass, Duryea Pa. can be particularly useful. In one particular embodiment, polymers which can exhibit low birefringence including cell cast acrylic, polycarbonate, cyclo-olefin copolymers, and the like. Cast acrylic polymers including Spartech Polycast™ (available from Spartech Corp., Clayton, Mo.), Evonik Acrylite™ GP (available from Evonik Cyro LLC, Parsippany, NU), Reynolds R-Cast™ (available from Reynolds Polymer Technology, Grand Junction, Colo.) and Plexiglas™ G (available from Arkema Inc., Briston, Pa.). Cell cast acrylic polymers can be preferred, since they can be readily machined providing a smooth surface, minimal thermal effects from machining operations, and low birefringence. In one particular embodiment, heat stabilized acrylic can be especially preferred, as described elsewhere. Although the disclosure that follows refers to the use of polymeric plates (e.g., as the first and second transparent plates 101, 102 described with reference to FIG. 1A), it is to be understood that glass plates can instead be used to produce any of the optical component arrays described herein.

Substrate 118 can be any suitable substrate that can be affixed to, adhered to, or stably sandwiched between the first inner surface 105 and the second inner surface 106 of the first and second transparent plates 101, 102. In some cases, substrate 118 can be affixed or adhered over substantially the entire surface; however, in some cases only a portion of the surface may be affixed or adhered. Substrate 118 can serve a dual purpose. In some cases, substrate 118 can impart a physical property such as strength to the optical component array such that machining operations can be reliably executed. In some cases, substrate 118 can be a portion of the optical component that imparts an optical property such as polarization to the component. In one particular embodiment, substrate 118 can be a multilayer dielectric film including inorganic films and coatings or multilayer film stacks; organic films such as polymeric films, polymeric film laminates, and multilayer polymeric films including polarizers such as reflective polarizers and absorbing polarizers; polarizers including polymeric multilayer optical film polarizers, McNeill polarizers, and wire-grid polarizers; retarders including quarter-wave retarders and half-wave retarders; films or coatings such as organic or inorganic dichroic reflectors and absorbers; and combinations thereof. In some cases, substrate 118 can be a coating or a layer that may be deposited by techniques including a vapor deposition technique such as sputtering or chemical vapor deposition, or a liquid deposition technique such as coating or spraying, onto one or both of the first inner surface 105 and the second inner surface 106 of the first and second transparent plates 101, 102.

In one particular embodiment, the substrate 118 is a reflective polarizer 118, such as a polymeric reflective polarizer, that is laminated between the first inner surface 105 and the second inner surface 106 of the first and second transparent plates 101, 102, before machining, for example by using a suitably clear adhesive, such as an optical adhesive. As used herein, reference is made to the substrate as being a reflective polarizer 118, for example a polymeric multilayer reflective polarizer, although it is to be understood that any of the substrates described above could be substituted to create an optical article having desired properties related to the substrate chosen.

In one particular embodiment, the fabrication of any optical component array can begin with a planar optical stack that comprises an adhesive, a plastic such as a visible-light transparent plastic, a glass, a dichroic coating, a scattering material, a reflective polarizer, an absorbing polarizer, a multilayer optical film, a retarder, a reflector, a retro reflector, a microstructured material, a lenticular structured material, a Fresnel structured material, an absorber, or a combination thereof. The planar optical stack can be arranged as needed to produce the desired optical component, and then be subject to the machining steps described herein. It is to be understood that the fabrication of an array of optical components can include combining the result of several array fabrication steps, such as lamination of a first array of 3-dimensional structures to a second array of 3-dimensional structures. In some cases, such a combination can include combining a first singulated element, linear array, or rectangular array of a first component with a second singulated element, linear array, or rectangular array of a second component.

Figure 1B:
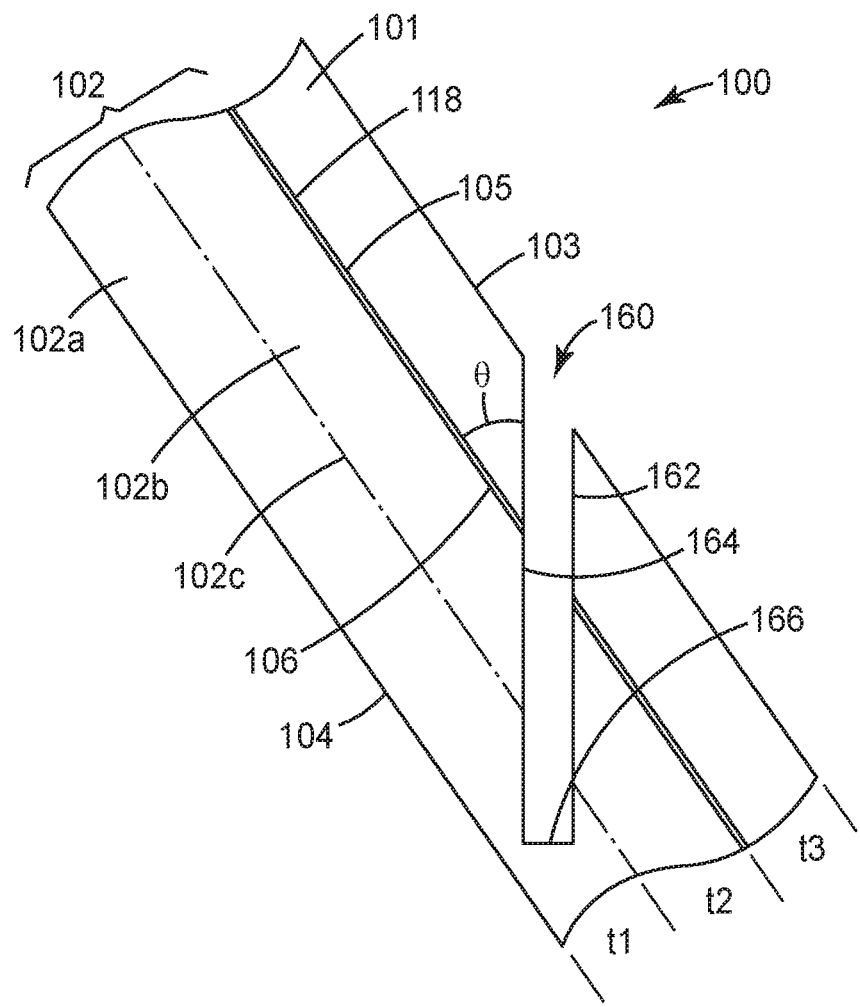
FIG. 1B shows a cross-sectional view of an optical laminate.

FIG. 1B shows a cross-sectional view of an optical laminate 100, according to one aspect of the disclosure. Each of the elements 101-104 shown in FIG. 1B correspond to like-numbered elements 101-104 shown in FIG. 1A, which have been described previously. For example, first transparent plate 101 shown in FIG. 1B corresponds to first transparent plate 101 shown in FIG. 1A, and so on. A first undercut trough 160 having opposing first sides, 162, 164 and a first bottom 166 has been formed in the optical laminate 100, extending through the first transparent plate 101 and the reflective polarizer 118. The first undercut trough 160 can extend into the second transparent plate 102 to any desired depth, although generally the depth is such that the optical laminate 100 does not separate into two pieces. The first undercut trough 160 forms an undercut angle θ with the reflective polarizer 118, and extends throughout the optical laminate 100 in a direction perpendicular to the cross-section shown in FIG. 1B. The undercut angle θ can be any desired angle, for example about 15 degrees, or about 30 degrees, or about 45 degrees, or about 60 degrees, or about 75 degrees, or generally any angle between about 5 degrees and about 90 degrees, depending on the optical components that are to be fabricated. In one particular embodiment, for example, a PBS can be fabricated by selecting the undercut angle θ to be about a 45 degree angle, although other angles can also be used.

The first undercut trough can be machined by techniques that may provide an acceptable surface finish that requires no additional processing such as polishing prior to being used as an imaging PBS. In some cases, the machining technique can be diamond machining including, for example, radial fly-cutting, axial fly-cutting, high speed diamond end milling, or diamond grinding. The surface finish can be characterized by techniques including, for example, white light interferometry, stylus profilometry, confocal microscopy, or atomic force microscopy (AFM). While it is generally accepted that a surface has "optical quality" if its finish is better than 3 micro-inches (approximately 75 nm) peak-to-valley measurement, each optical application determines the actual acceptable requirement. In some cases, additional polishing can be performed if desired, including for example polishing using a technique comprising mechanical polishing, flame polishing, vapor polishing, or a combination thereof.

In one particular embodiment, each of the opposing first sides 162, 164 of first undercut trough 160 can be machined such that they are parallel to each other, or instead, each may be machined so that they form any desired angle relative to each other, depending on the optical component that is desired. In some cases, the first bottom 166 can be perpendicular to each of the opposing first sides 162, 164, or instead, the first bottom 166 can form any desired angle to each of the opposing first sides 162, 164, depending on the optical component that is desired. In one particular embodiment, a plurality of troughs (not shown) can be machined in the optical laminate 100, each of the plurality of troughs can be parallel to each other, or can be machined at a desired angle to each other, and can be machined to any desired depth for formation of a desired optical component, as described elsewhere.

Figure 2A:
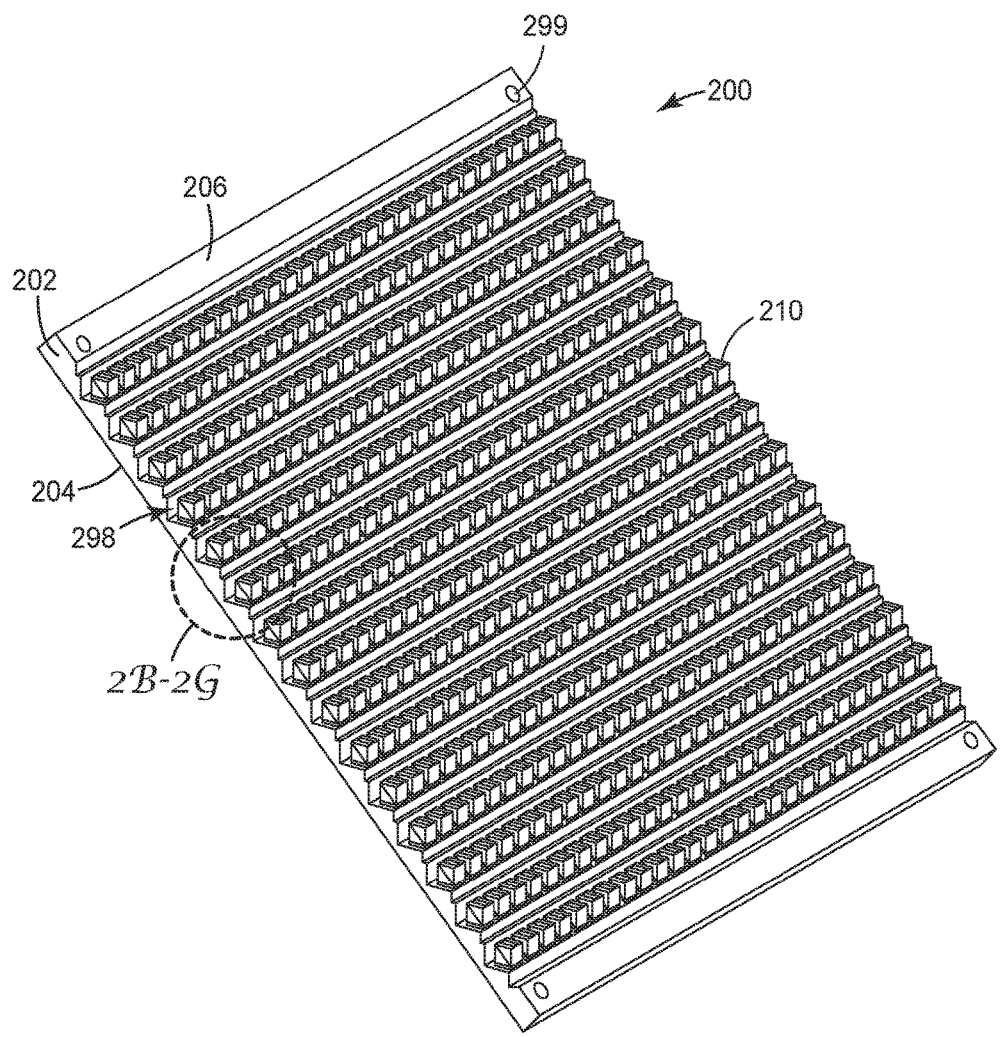
FIG. 2A shows a perspective schematic view of an integrated optical component.

FIG. 2A shows a perspective schematic view of a milled optical laminate 200 that when machined as shown can be described as an integrated optical component 200, according to one aspect of the disclosure. Integrated optical component 200 includes a support 202 having a planar second surface 204 and an opposing second surface 203. The opposing second surface 203 includes a plurality of stair steps 298 that include a plurality of polarizing beam splitter (PBS) cubes 210 disposed on each of the plurality of stair steps 298. Integrated optical component 200 can be singulated into individual PBS cubes 210, as described elsewhere. The integrated optical component 200 can optionally further include one or more alignment holes 299 that can serve to both secure and register the integrated optical component 200 during machining operations. Representative fabrication steps to produce integrated optical component 200 are described in FIGS. 2B-2F, which show an enlarged view of a portion of the milled optical laminate 200 undergoing typical fabrication steps necessary to become integrated optical component 200. It is to be understood that the fabrication steps described can be performed in any desired order to produce the array of integrated optical components 200 ready to be singulated into individual PBS cubes 210.

Figure 2B:
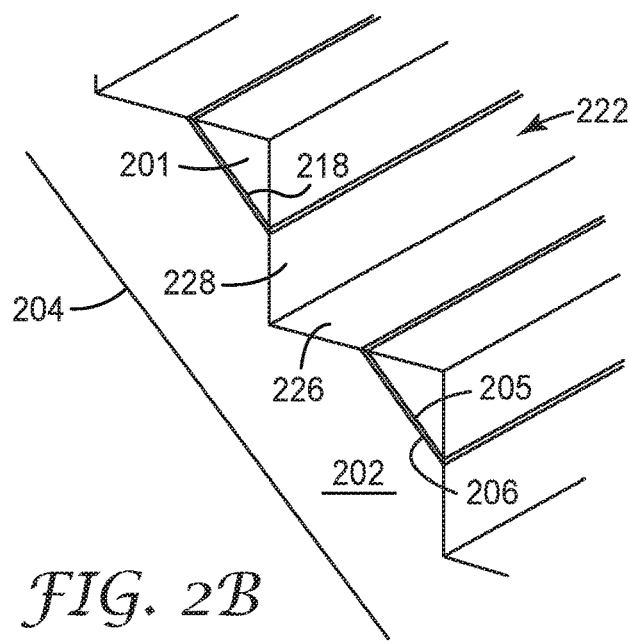
FIG. 2B shows a perspective schematic view of a milled optical laminate.

FIG. 2B shows a perspective schematic view of a milled optical laminate, having a support 202 which can generally be described as second transparent plate 202 with a planar second surface 204, according to one aspect of the disclosure. Each of the elements 201-218 shown in FIG. 2B corresponds to like-numbered elements 101-118 shown in FIG. 1A, which have been described previously. For example, second transparent plate 202 shown in FIG. 2B corresponds to second transparent plate 102 shown in FIG. 1A, and so on. As can readily be seen from comparison of FIG. 1A to FIG. 2B, the optical laminate of FIG. 1A can have a plurality of notches 222 machined into the first outer surface 103 of FIG. 1A to form the milled optical laminate of FIG. 2B. Each of the notches 222 have a first surface 226 and a second surface 228 that can be orthogonal to each other and pass through the first transparent plate 201, the reflective polarizer 218, and into the second transparent plate 202. In some cases, the machining of notches 222 can be omitted from the fabrication procedure; however, in some cases it can be desirable to include notches 222.

Figure 2C:
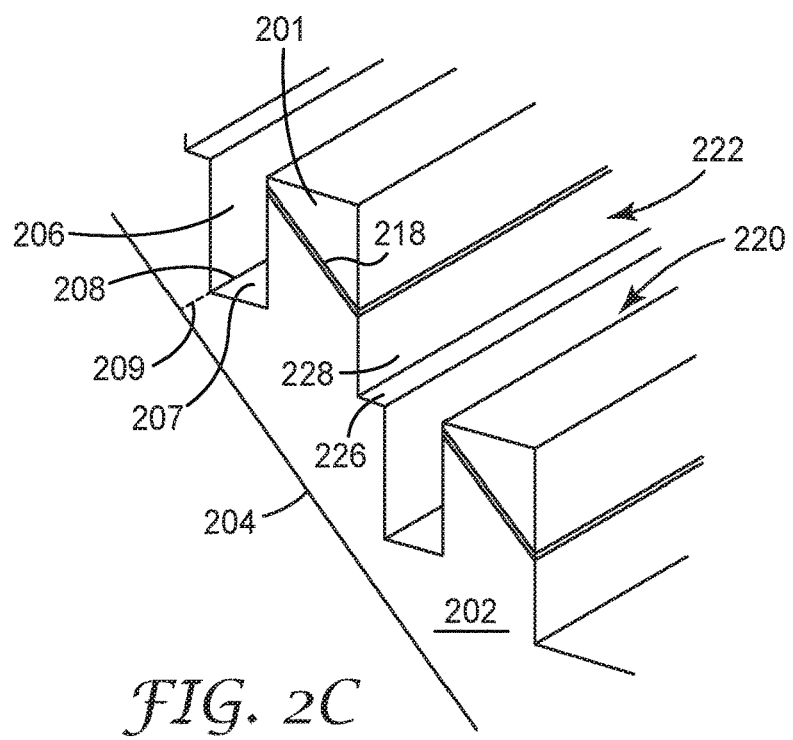
FIG. 2C shows a perspective schematic view of a milled optical laminate.

FIG. 2C shows a perspective schematic view of a milled optical laminate, having a support 202 with a planar second surface 204, according to one aspect of the disclosure. Each of the elements 201-228 shown in FIG. 2C corresponds to like-numbered elements 201-228 shown in FIG. 2B, which have been described previously. For example, second transparent plate 202 shown in FIG. 2C corresponds to second transparent plate 202 shown in FIG. 2B, and so on. In FIG. 2C, a plurality of first undercut troughs 220 extend through the first transparent plate 201, the reflective polarizer 218, and into the second transparent plate 202, in a manner similar to that shown in FIG. 1B. The first undercut trough 220 includes a bottom and a side, which can be referred to as a stair step tread 207 and a stair step riser 206, respectively. The stair step tread 207 and stair step riser 206 meet at a first edge 208 that forms a first hinge 209 through the second transparent plate 202 to the planar second surface 204. In some cases, first hinge 209 can be useful as a first severable position to separate adjacent rows of optical components, as described elsewhere.

Figure 2D:
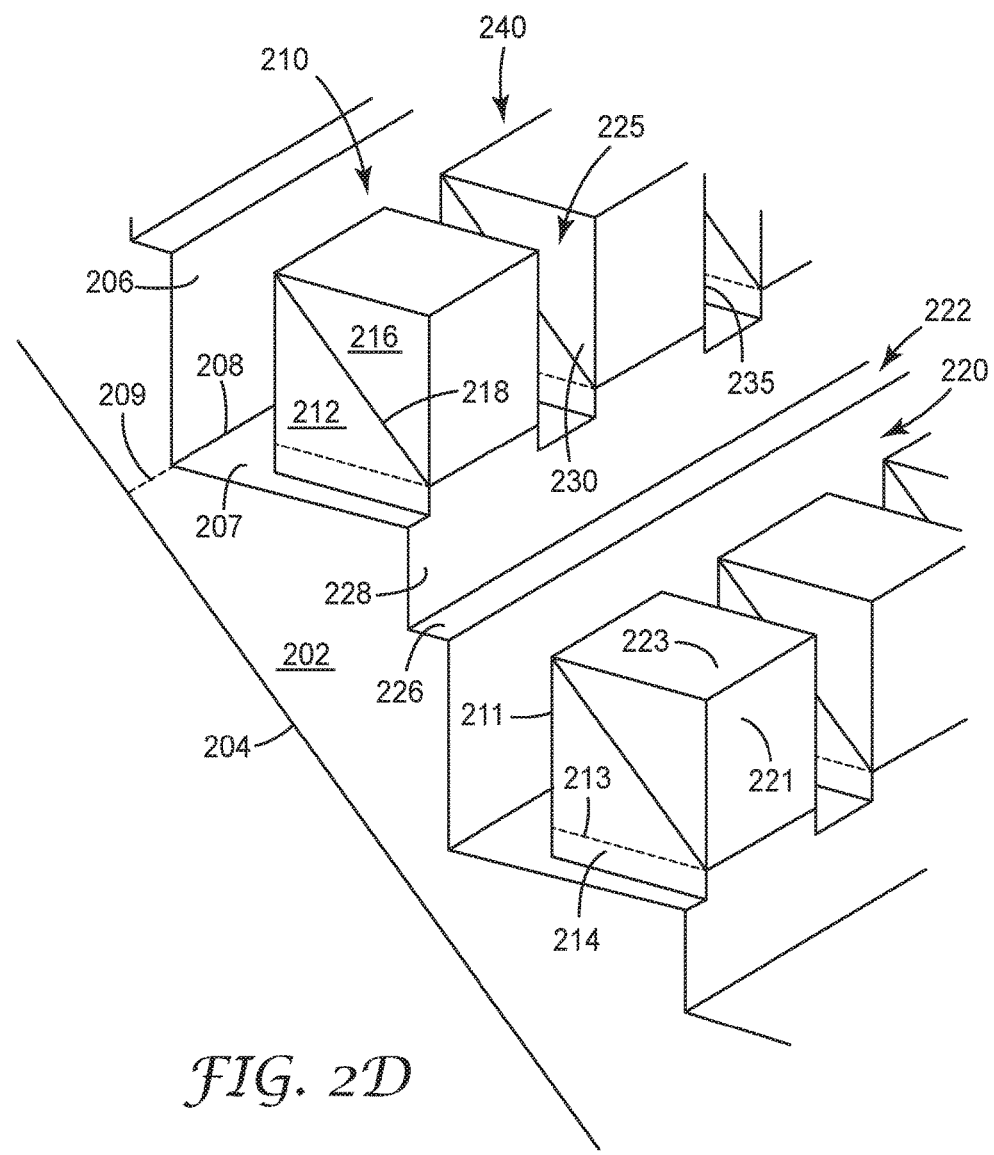
FIG. 2D shows a perspective schematic view of a milled optical laminate.

FIG. 2D shows a perspective schematic view of a milled optical laminate, having a support 202 with a planar second surface 204, according to one aspect of the disclosure. Each of the elements 201-228 shown in FIG. 2D corresponds to like-numbered elements 201-228 shown in FIG. 2C, which have been described previously. For example, second transparent plate 202 shown in FIG. 2D corresponds to second transparent plate 202 shown in FIG. 2C, and so on. In FIG. 2D, a plurality of second troughs 225 are machined to separate adjacent PBS cubes 210 from each other. Second troughs 225 can be machined so that treads 207 are co-planar between first undercut trough 220 and second troughs 225, and each PBS cube 210 is aligned in a PBS cube row 2 on tread 207. The second troughs 225 separate each of the PBS cubes 210 that can be seen as comprising first prism 212, second prism 216, reflective polarizer 218 between them, and opposing end faces 230, 235. The first prism 212 includes a first prism surface 211 separated by the first undercut trough 220 from the riser 206, and a second prism surface 213 adjacent the tread 207. The second prism 216 includes a third prism surface 221 opposite the first prism surface 211, and an adjacent fourth prism surface 223 opposite the second prism surface 213. In some cases, first prism 212 includes the second prism surface 213 separated from the adjacent tread 207 by a prism extension 214. Prism extension 214 provides for a separation of the PBS cubes 210 from the tread 207, and can be machined off during subsequent processing steps, as described elsewhere.

Figure 2E:
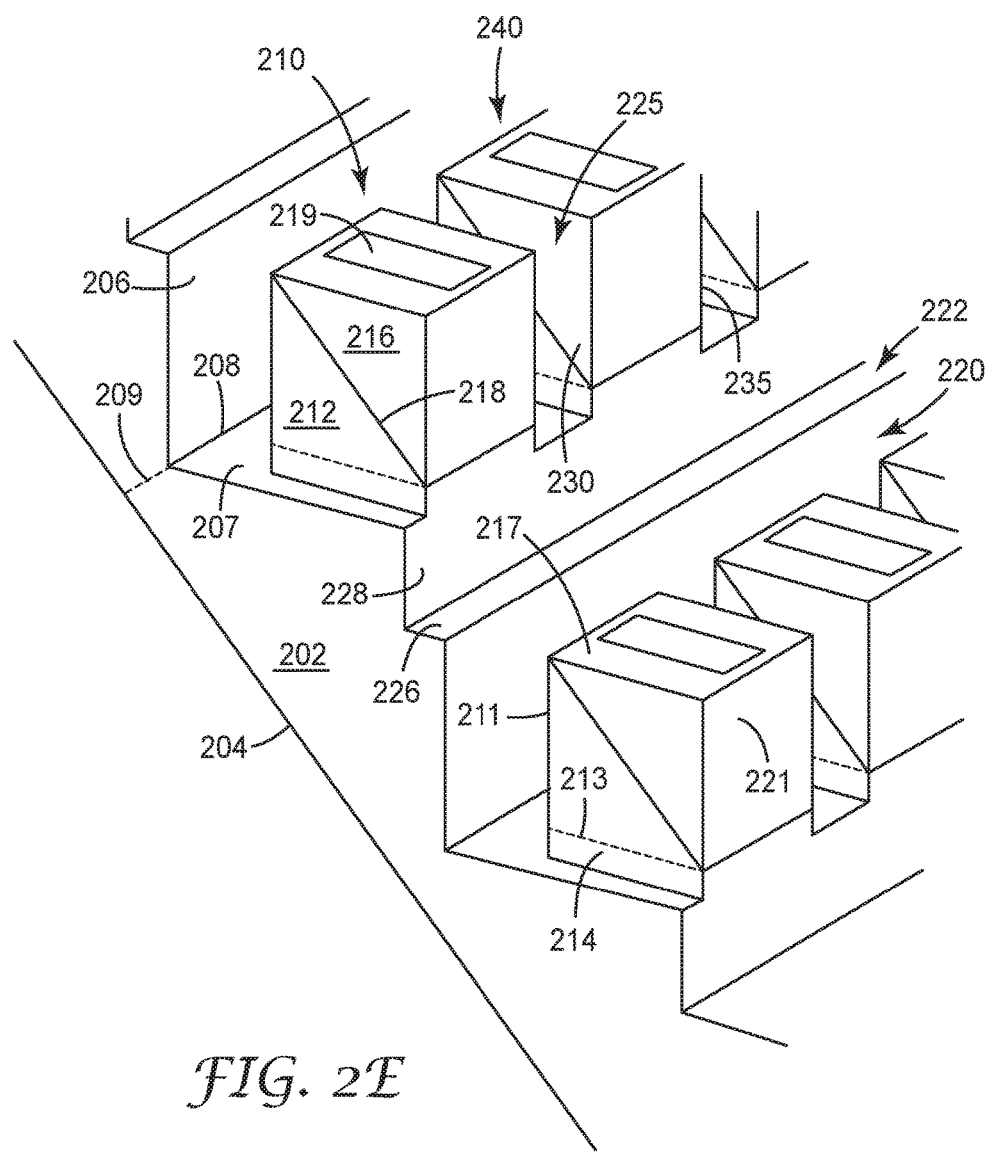
FIG. 2E shows a perspective schematic view of a milled optical laminate.

FIG. 2E shows a perspective schematic view of a milled optical laminate, having a support 202 with a planar second surface 204, according to one aspect of the disclosure. Each of the elements 201-240 shown in FIG. 2E corresponds to like-numbered elements 201-240 shown in FIG. 2D, which have been described previously. For example, second transparent plate 202 shown in FIG. 2E corresponds to second transparent plate 202 shown in FIG. 2D, and so on. In FIG. 2E, operations are performed to create an aperture 219 extending above an aperture frame 217, by machining the aperture frame 217 into the fourth prism surface 223 (shown in FIG. 2D) of second prism 216. After aperture frame 217 has been machined into the fourth prism surface 223, first coating operations such as coating all surfaces with a black absorbing coating, can be performed on the milled optical laminate, as described elsewhere. In some cases, the black absorbing coating can be a solvent based paint, or a curable paint such as a two-part urethane, epoxy, or a radiation curable paint. Exemplary paints include, for example, Dupli-Color® Perfect Match™ BUN0100 paint (available from Sherwin-Williams Co., Cleveland, Ohio), N923SP Satin Black 2-part polyurethane (available from Matthews Paint, Delaware, Ohio), and F63B12 POLANE® T Satin Black 2-part polyurethane (available from Sherwin-Williams Co., Cleveland, Ohio). Subsequent machining operations can then be performed on the milled optical laminate to form an integrated optical component having desired black-coated surfaces and polished optical surfaces.

Figure 2F:
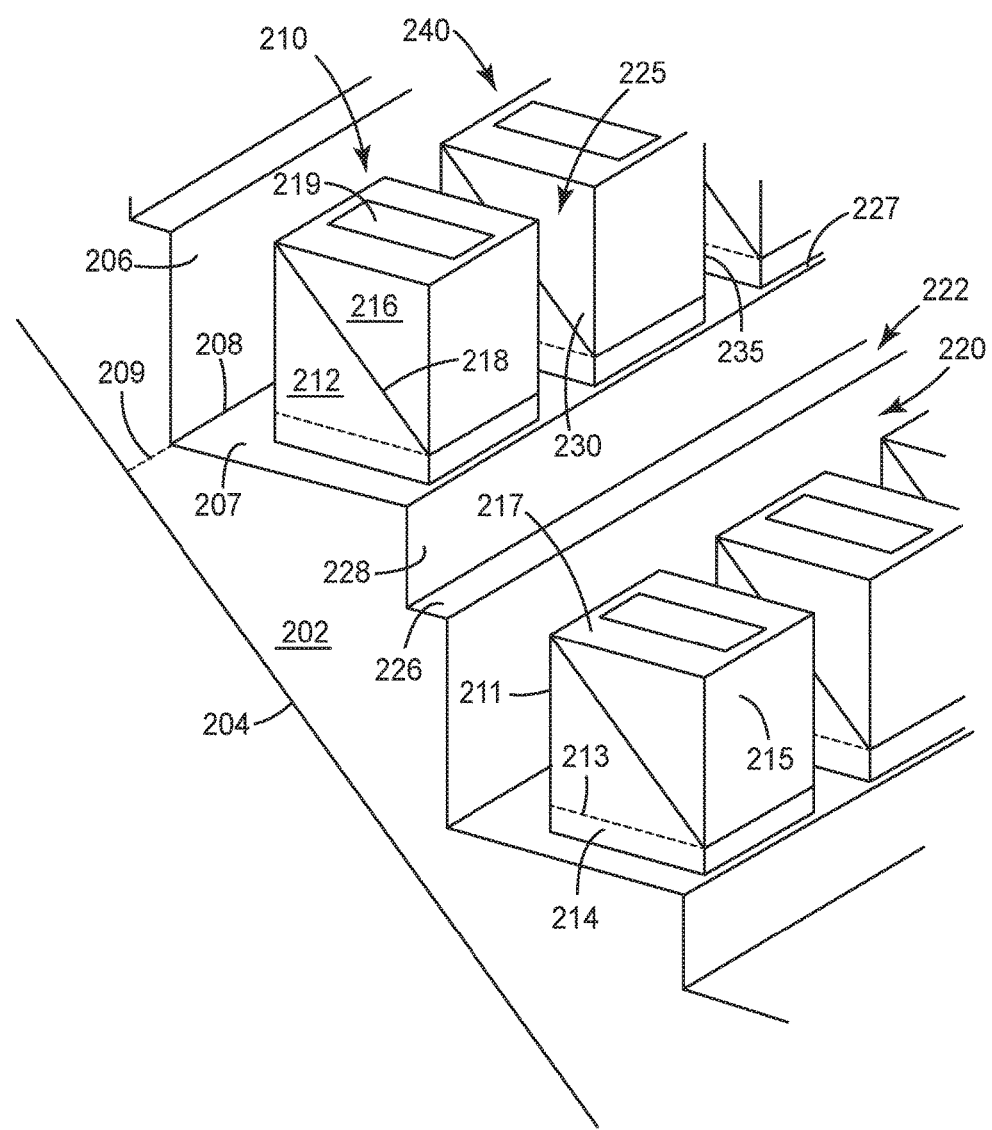
FIG. 2F shows a perspective schematic view of an integrated optical component.

FIG. 2F shows a perspective schematic view of an integrated optical component having a support 202 with a planar second surface 204, according to one aspect of the disclosure. FIG. 2F shows steps for one technique of singulation along first hinge 209. Each of the elements 201-240 shown in FIG. 2F corresponds to like-numbered elements 201-240 shown in FIG. 2E, which have been described previously. For example, second transparent plate 202 shown in FIG. 2F corresponds to second transparent plate 202 shown in FIG. 2E, and so on. In FIG. 2F, further machining steps have been performed to prepare the integrated optical component having a plurality of individual PBS cubes 210, for singulation. In one particular embodiment, third prism surface 221 shown in FIG. 2E can first be machined to remove the first coating applied to third prism surface 221, and then polished to form a front output face 215 of PBS cube 210. A ledge 227 may be formed along tread 207 during the machining operation. In a similar manner, aperture 219 can also be machined to remove the first coating, and polished. If desired, additional coatings such as, for example, AR coatings and the like, can also be applied to front output face 215 and aperture 219, after polishing.

In one particular embodiment as shown in FIG. 2F, each tread 207 can then be separated from each riser 206 along first edge 208 by flexing along first hinge 209 until the first hinge 209 breaks, to result in individual rows 240 of PBS cubes 210. Rows 240 of PBS cubes 210 can then be supported by embedding PBS cubes 210 in a removable potting material (not shown) for subsequent machining to remove prism extension 214 and polishing to reveal the second prism surface 213. In some cases, rows 240 of PBS cubes 210 can instead be supported by adhering the PBS cubes 210 to a removable adhesive surface (not shown) for subsequent machining to remove prism extension 214 and polishing to reveal the second prism surface 213. The removable potting material or removable adhesive surface can then be removed to result in a singulated PBS cube.

Figure 2G:
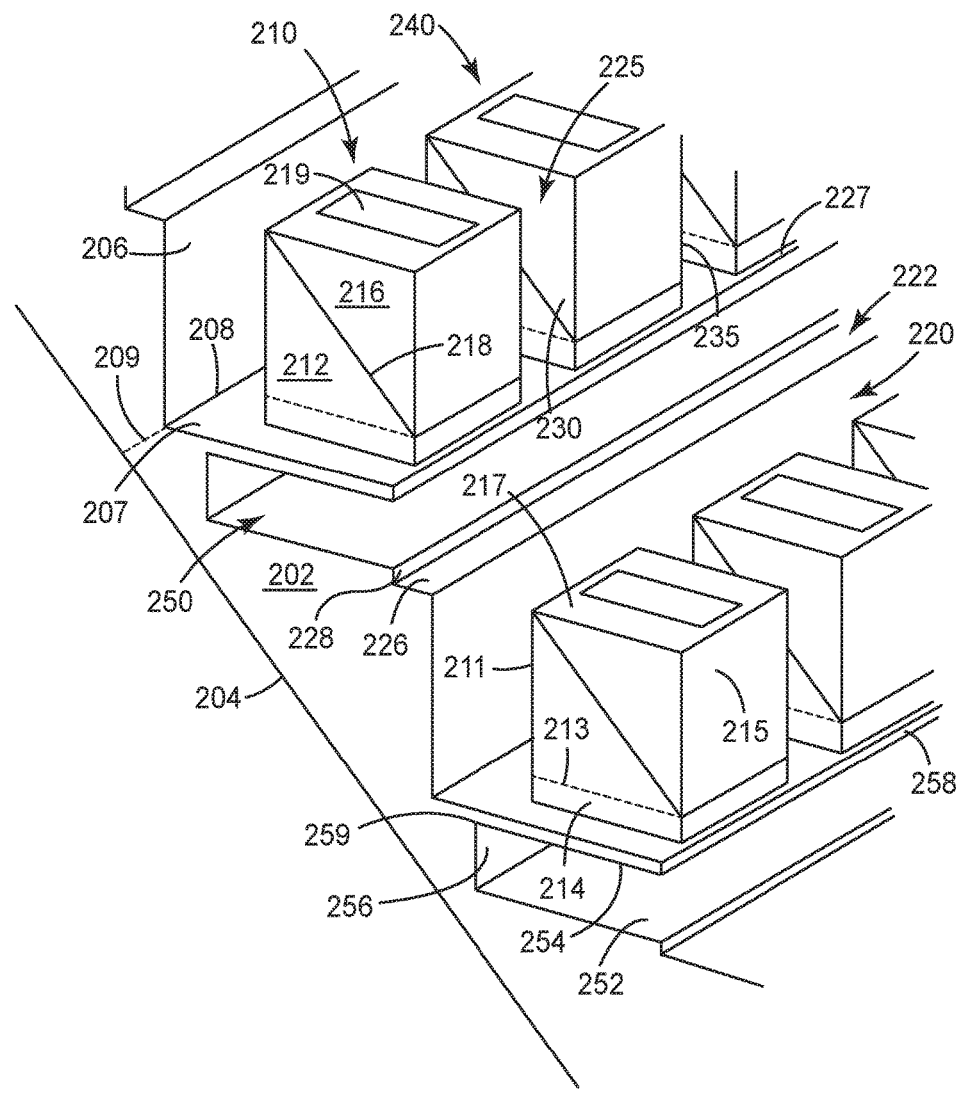
FIG. 2G shows a perspective schematic view of an integrated optical component.

FIG. 2G shows a perspective schematic view of an integrated optical component having a support 202 with a planar second surface 204, according to one aspect of the disclosure. FIG. 2G shows steps for an alternate technique of singulation along a second hinge 259. Each of the elements 201-240 shown in FIG. 2G corresponds to like-numbered elements 201-240 shown in FIG. 2F, which have been described previously. For example, second transparent plate 202 shown in FIG. 2G corresponds to second transparent plate 202 shown in FIG. 2F, and so on. In FIG. 2G, a plurality of third troughs 250 are machined such that each of the third troughs 250 are parallel to the first undercut troughs 220, and are perpendicular to the risers 206 such that they form a flange 258 supporting the PBS cubes 210. The third troughs 250 include opposing sides 252, 254 and a bottom 256, and form a second hinge 259 between the tread 207 and second side 254.

In one particular embodiment shown in FIG. 2G, each tread 207 can then be separated from each riser 206 by flexing along second hinge 259 until the second hinge 259 breaks, to result in individual rows 240 of PBS cubes 210. Rows 240 of PBS cubes 210 can then be supported by embedding PBS cubes 210 in a removable potting material (not shown) for subsequent machining to remove prism extension 214 and polishing to reveal the second prism surface 213. In some cases, rows 240 of PBS cubes 210 can instead be supported by adhering the PBS cubes 210 to a removable adhesive surface (not shown) for subsequent machining to remove prism extension 214 and polishing to reveal the second prism surface 213. The removable potting material or removable adhesive surface can then be removed to result in a singulated PBS.

Figure 3A:
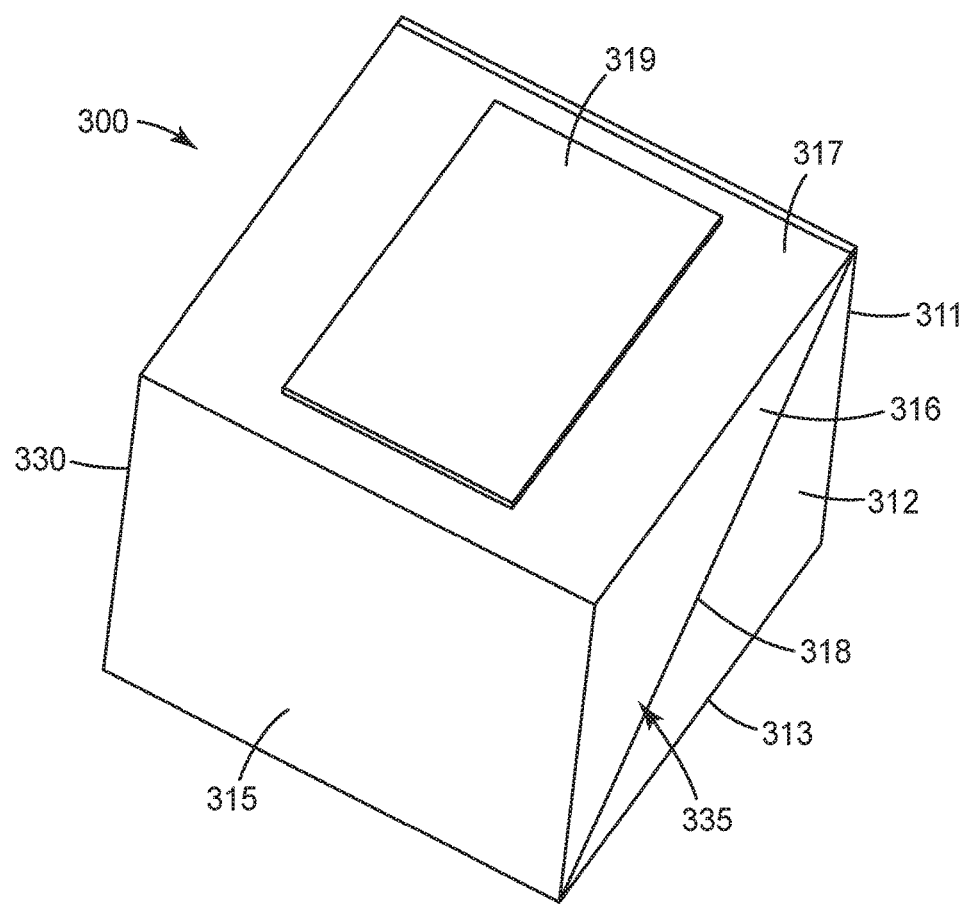
FIG. 3A shows a perspective schematic view of a singulated PBS.

FIG. 3A shows a perspective schematic view of a singulated PBS 300, according to one aspect of the disclosure. Each of the elements 311-330 shown in FIG. 3A corresponds to like-numbered elements 211-230 shown in FIG. 2G, which have been described previously. For example, aperture 219 shown in FIG. 3A corresponds to aperture 219 shown in FIG. 2G, and so on. Singulated PBS 300 includes a first prism 312, a second prism 316, and a reflective polarizer 318 disposed between the first and second prism 312, 316. First prism 312 includes a first surface 311, and a second surface 313 that can be polished to serve as an input surface 313 for a light source (not shown). Second prism 316 includes a third surface 315 that can be an output surface 315, opposite the first surface 311. Second prism 316 further includes an aperture 319 and an aperture frame 317 surrounding the aperture 319, that together are opposite the second surface. An LCoS imager (not shown) can be positioned against aperture 319, and a light source (not shown) positioned to inject light into input surface 313 to generate an image projected from the output surface 315. In one particular embodiment, first surface 311, aperture frame 317, and opposing ends 330, 335, can include an absorbing black coating to minimize unwanted light introduction into the singulated PBS 300, as described elsewhere.

Figure 3B:
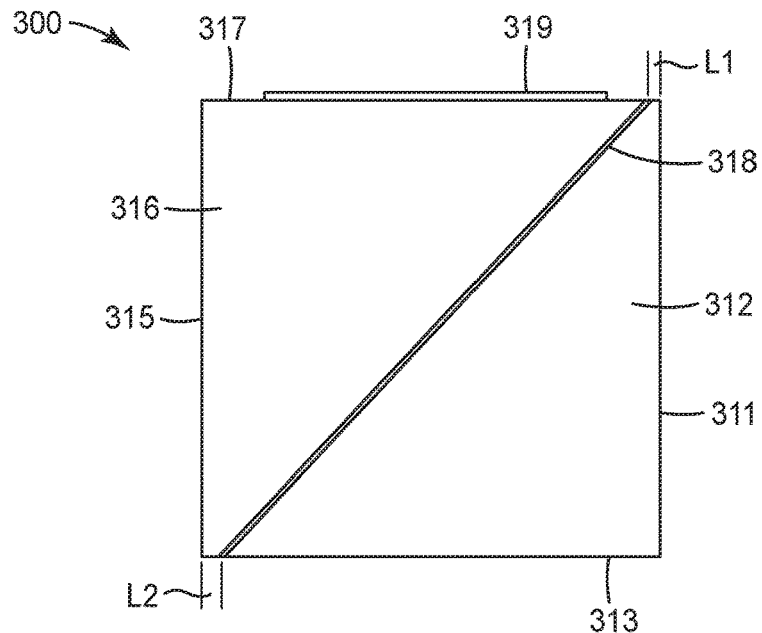
FIG. 3B-3C shows schematic side and top views of the singulated PBS of FIG. 3A.
Figure 3C:
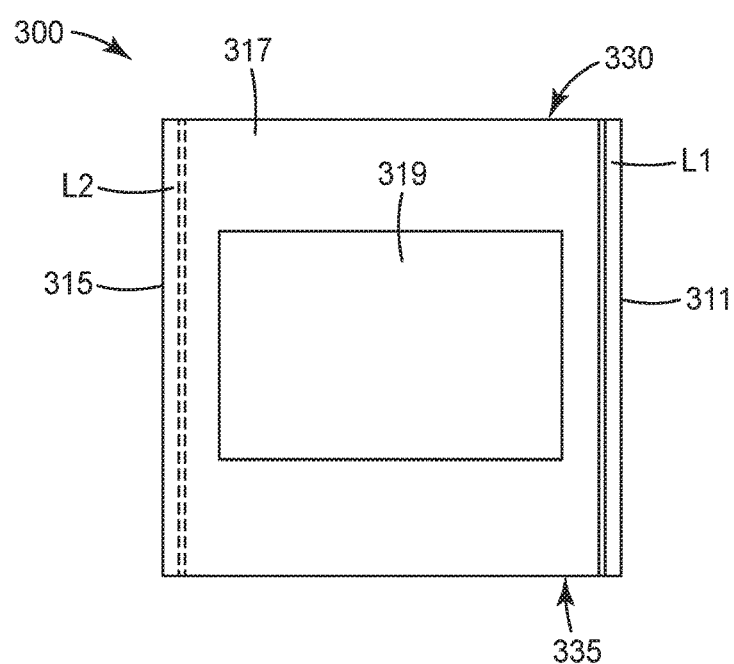

FIGS. 3B-3C show a schematic side and top views of the singulated PBS 300 of FIG. 3A, according to one aspect of the disclosure. In FIGS. 3B-3C, a first and a second overhang distance "L1" and "L2" can be useful for protecting the cut edge of the reflective polarizer 318. In one particular embodiment, the first and second overhang distance L1 and L2 may be chosen subject to other constraints imposed by the optical design, since there may be a potential optical path length change in the system. In some cases, L1 and L2 can become part of the optical path length, so the overall optical design may need to accommodate that change in dimension. A person of ordinary skill in the art would recognize the need to consider this additional optical path length. From a manufacturing perspective, the overhang may make it easier in some cases to create the form in the junction where two solid prisms come together.

Example

An integrated optical component array of PBS cubes was fabricated.

Preparation of Adhesive

First, an adhesive solution was prepared by mixing together 48.78 lb (22.15 kg) of an optically clear adhesive (OCA) solution having 20.5% solids (the OCA solution was a copolymer having 93% isooctyl acrylate and 7% acrylic acid, in a mixed solvent of methyl ethyl ketone/methanol/toluene/ethyl acetate); 17.14 lb (7.78 kg) of a High Tg polymer having 35% solids (High Tg polymer was a copolymer having 69% methyl methacrylate, 25% butyl methacrylate, and 6% dimethyl aminoethyl methacrylate, in a mixed solvent of methyl ethyl ketone/methanol/toluene/ethyl acetate); 8 lb (3.63 kg) of 4-hydroxybutyl acrylate (available from BASF, Florham Park, N.J.); 0.12 lb (54 gm) methacrylate functional silane monomer (Silane A-174, available from Sigma-Aldrich, St. Louis, Mo.); 0.4 lb (182 gm) Lucirin TPO-L (available from BASF); 0.244 lb (111 gm) of a bisamide crosslinker having 5% solids (1,1'-isophthaloylbis (2-methylaziridne) in toluene); 44.94 lb (20.4 kg) ethyl acetate 99% (available from Sigma-Aldrich); and 29.96 lb (13.6 kg) isopropyl alcohol (available from Sigma-Aldrich).

The adhesive solution was coated onto a 14 inch (35.56 cm) first release liner (SKC RF22N, 75 micron thick, available from SKCHaas, Seoul, KR) using a die coating method and apparatus as described in U.S. Pat. No. 5,759,274 (Maier et. al.). The coating line speed was 20 ft/min (6.09 m/min), and the coating width of the solution was 12 inch (30.48 cm), giving a 1 inch uncoated margin on both sides of the coating. A gear pump solution delivery system was used to deliver the solution to the die. Flow rate was adjusted to achieve a coating thickness of 10 microns. The coated solution was dried in-line by running the liner with coating solution through a series of ovens, and prior to winding up the adhesive/first release liner into a roll, a second 14 inch wide release liner (CPfilm T-10, 3 mil (76 micron) thick, available from CP Films, Fieldale, Va.), was laminated to the exposed adhesive surface, forming an adhesive with dual release liners.

Preparation of Heat Stabilized Transparent Plates

A PMMA POLYCAST CLR Plate available from Spartech Corporation was cut into 12" (30.5 cm) square plates. The PMMA plates were hanged in an environmental oven using binder clips, and annealed using the profile: (1) ramp ovens to 95 C, 30% RH over one hour, (2) hold ovens at 95 C, 30% RH for 60 hours, (3) ramp ovens to 30 C and 0% RH over one hour. The annealed PMMA plates were then planarized using a conventional CNC mill, and a planar tool, to final transparent plate thickness of 5.10+/−0.01 mm.

Formation of Optical Laminate

An AGL Industrial Laminator (available from AGL Inc, Deforest, Wis.) was used to laminate adhesive EAS 2059 to both side of a 14" (35.6 cm) wide, 40 micron thick Vikuiti™ MOF reflective polarizer, available from 3M Company. The process conditions were: tension control between 10-15 psi, nipped roller pressure about 20-30 psi, and speed control about 5-10 fpm. The resulting adhesive/MOF/adhesive laminate was sheeted into 25" (63.5 cm) using a shear cutter.

A Sun-Tec laminator (available from Sun-Tec, Ariz.) was used to laminate adhesive/MOF/adhesive sheet to a planarized annealed PMMA plate. The process conditions were: nipped roller pressure about 0.3-0.4 MPa, and lamination speed about 50 mm/sec.

A ChemInstrument Hot Roll Laminator (available from ChemInstruments, Inc., Fairfield, Ohio) was used to laminate the planarized annealed PMMA/adhesive/MOF/adhesive to another annealed PMMA. The process conditions were: nipped roller pressure about 100 psi, and lamination speed about 2 min/min.

The resulting PMMA/adhesive/MOF/adhesive/PMMA laminates were then autoclaves at 60 C and 80 PSI for 8 hours. A Dymax 5000-EC Series UV Curing Flood Lamp Systems (available from Dymax, Torrington, Conn.) was used to cure the adhesive in the autoclaved PMMA/adhesive/MOF/adhesive/PMMA laminate, with the UVA dosage (measured through air) equal to about 1 J/cm2.

After UV curing, the un-planarized side of output plate PMMA/adhesive/APF/adhesive/planarized PMMA was then laminated with another ¼" (0.635 cm) thick PMMA plate (available from McMaster-Carr) using 3M Optically Clear Adhesive (OCA 8146-5 available from 3M Company), to form an optical laminate similar to that shown in FIG. 1A having a dual thickness second transparent plate 102.

Machining of Optical Laminate to Form Integrated Optical Component Array

After the lamination process, the laminate underwent fabrication process. Alignment holes (alignment holes 299 in FIG. 2A) were drilled and the un-planarized PMMA surface was planarized (planar second surface 204 in FIG. 2A). A Hurco CNC mill (Hurco, Indianapolis, Ind.) using Siemens NX software 7.5 with integrated CAD/CAM/CAE was used to provide drawing and complete part manufacturing solutions for tooling and machining the optical components. Referring to FIG. 2G, different milling bits (available from Harvey Tool, Rowley, Mass.) were used to fabricate the integrated optical component array having PBS cubes 210. A Carbide plastic cutting end mill, tool #49908-C4 (cutter diameter ⅛", length of cut ⅝", available from Harvey Tool, Rowley, Mass.) was used to mill first prism surface 211, aperture frame 217, and opposing end faces 230, 235, in preparation for black coating.

Black Coating Application

A KL4530 Desktop CNC Router (available from Automation Technology Inc, Hoffman Estates, Ill.) was used as XYZ robot, onto which a Nordson 787MS-SS MicroSpray precision spray valve (available from Nordson Corp, Westlake, Ohio) was attached. A small gauge (0.013"-0.004" internal diameter) disposable end-hole dispensing tip was used, and in some cases disposable side port dispensing tips were used (18-26 gauge), available from Hamilton Company, Reno, Nev. Dupli-Color® Perfect Match™ BUN0100 paint (available from Sherwin-Williams Co., Cleveland, Ohio) was sprayed precisely onto the first prism surface 211. BUN0100 paint was sprayed from an aerosol can onto all other surfaces including aperture frame 217, and opposing end faces 230, 235, by hand.

Milling Aperture, Output Surface, and Flange

After the black coating process, front output face 215 and aperture 219 was milled to remove the black coating and diamond polished, using a Carbide plastic cutting end mill, tool #48716-C4 (cutter diameter ¼", length of cut ¾") and a PCD diamond end mill, tool #12124 (cutter diameter ⅜", length of cut ¼"), both available from Harvey Tool, Rowley, Mass. Third trough 250 was milled to create flange 258 using Carbide plastic cutting end mill tool #49908-C4 (cutter diameter ⅛", length of cut ⅝", available from Harvey Tool, Rowley, Mass.).

Singulation and Polishing of PBS Cubes

Rows of PBS Cubes 210 on separate flanges 258 were created by tearing out by hand along the second hinge 259. The aperture 219 of each cube strip was adhered on a glass plate using 3M™ Removable Repositionable Tape 666, and the flange 258 and prism extension 214 were then milled off to singulate into individual cubes using the KL4530 Desktop CNC Router with a Diablo ¼"×1" Carbide Straight Router Bit Model # DR04108 (available from Freud, High Point, N.C.).

The resulting PBS cubes were similar to the singulated PBS 300 shown in FIGS. 3A-3C, and had the following dimensions. The aperture 319 measured 3.6 mm×5.8 mm, was raised 0.1 mm above the aperture frame 317, and was centered on the top surface that measured 7.2 mm×7.2 mm. The opposing ends 330, 335 of singulated PBS 300 measured 7 mm from input surface 313 to aperture 319, and 7.2 mm from output surface 315 to first surface 311. First overhang L1 measured 0.1 mm, and second overhang L2 measured 0.2 mm. The black coating was nominally 0.045 mm thick.

A Buehler Vector Head/Beta polishing machine (available from Buehler, Lake Bluff, Ill.) operating at a speed of 200 rpm and with the force setting off/hand pressure, was used to further polish the optical surfaces, such that the optical surfaces had a peak-to-valley roughness of less than about 0.32 microns. The input surface 313 (i.e., the bottom backlight surface) was polished by mounting cubes on a glass plate using 3M removable tape 666. The spacing between the cubes was filled with 3M ESPE Imprint 3 light body dental impression material to secure the cubes. The input surface 313 was re-finished using Buehler abrasive disc P2500 for 1.5 hours, and polished using Buehler Master Prep 0.05 micron slurry solution for 1 minute.

The output surface 315 was polished by mounting cubes on a glass plate using 3M removable tape 666. The spacing between the cubes was filled with 3M ESPE Imprint 3 light body dental impression material to secure the cubes. The output surface 315 was sanded off using Buehler abrasive disc P1200 for 3 minutes, re-finished using Buehler abrasive disc P2500 for 15-20 minutes, and polished using Buehler Master Prep 0.05 micron slurry solution for 1 minute.

The aperture 319 was polished by mounting cubes on a glass plate using 3M removable tape 666. The spacing between the cubes was filled with 3M ESPE Imprint 3 light body dental impression material to secure the cubes. The aperture 319 was sanded off using Buehler abrasive disc P1200 for 3 minutes, re-finished using Buehler abrasive disc P2500 for 15 minutes, re-finished using 3M Lapping film 562X mounted on glass plate using a PSA for 1 minute, re-finished using a Buehler 3 um slurry suspension for 3 minutes, polished using a Buehler Master Prep slurry solution for 1 minute, and lapped by hand using 3M Lapping film 568X mounted on glass plate using PSA for 1 minute.

Following are a list of embodiments of the present disclosure.

Item 1 is an integrated optical component, comprising: a support having a planar first surface and an opposing second surface, the opposing second surface comprising a plurality of stair steps, each of the plurality of stair steps having a tread and a riser that intersect to form a hinge proximate the planar first surface; a polarizing beam splitter (PBS) cube disposed on each of the plurality of stair steps and integral with the support, the PBS cube comprising: a first prism having a first prism surface adjacent the riser and a second prism surface adjacent the stair step; a second prism having a third prism surface opposite the first surface and a fourth prism surface opposite the second surface; and a reflective polarizer disposed on a diagonal surface between the first prism and the second prism, the reflective polarizer being parallel to the planar first surface of the support, wherein the first prism surface is separated by a first trough from the riser, and the PBS cube includes opposing end faces orthogonal to the tread and to the riser.

Item 2 is the integrated optical component of item 1, wherein each tread includes at least two PBS cubes having end faces separated by a second trough.

Item 3 is the integrated optical component of item 1 or item 2, wherein each second prism surface is separated from the adjacent tread by a prism extension.

Item 4 is the integrated optical component of item 1 to item 3, further comprising a black coating disposed on at least one of the first prism surface, the third prism surface, the fourth prism surface, and the end face.

Item 5 is the integrated optical component of item 1 to item 4, wherein at least one of the first prism surface, the third prism surface, the fourth prism surface, and the end face, comprises a polished surface.

Item 6 is the integrated optical component of item 1 to item 5, wherein the third prism surface is adjacent a notch in the riser, the notch having a first notch surface parallel to the tread and a second notch surface adjacent the second prism surface and parallel to the riser.

Item 7 is the integrated optical component of item 1 to item 6, wherein the tread and the riser of each stair step intersect at a 90 degree angle.

Item 8 is the integrated optical component of item 1 to item 7, wherein the tread of each stair step is disposed at a 45 degree angle to the planar first surface.

Item 9 is the integrated optical component of item 1 to item 8, wherein at least one of the support, the first prism, and the second prism comprises a heat stabilized acrylic.

Item 10 is the integrated optical component of item 9, wherein the heat stabilized acrylic has a retardance of less than 20 nm.

Item 11 is the integrated optical component of item 1 to item 10, wherein the first prism surface is a back black coated surface, the second prism surface is a polished light input surface, the third prism surface is a polished output surface, and the fourth prism surface comprises a polished aperture suitable for a liquid crystal on silicon (LCoS) imager.

Item 12 is an integrated optical component, comprising: a support having a planar first surface and an opposing second surface, the opposing second surface comprising a plurality of stair steps, each of the plurality of stair steps having a tread and a riser that intersect to form a hinge proximate the planar first surface; a plurality of polarizing beam splitter (PBS) cubes integral with the support and disposed in a line on each of the plurality of stair steps, each of the plurality of PBS cubes comprising: a first prism having a first prism surface adjacent the riser and a second prism surface adjacent the stair step; a second prism having a third prism surface opposite the first surface and a fourth prism surface opposite the second surface; a reflective polarizer disposed on a diagonal surface between the first prism and the second prism, the reflective polarizer being parallel to the planar first surface of the support; and opposing end faces, each opposing end face orthogonal to the reflective polarizer, wherein each first prism surface is separated by a first trough from the riser, and a second trough separates adjacent PBS cubes on the riser.

Item 13 is the integrated optical component of item 12, wherein each second prism surface is separated from the adjacent tread by a prism extension.

Item 14 is the integrated optical component of item 12 or item 13, further comprising a black coating disposed on at least one of the first prism surface, the third prism surface, the fourth prism surface, and the end face.

Item 15 is the integrated optical component of item 12 to item 14, wherein at least one of the first prism surface, the third prism surface, the fourth prism surface, and the end face, comprises a polished surface.

Item 16 is the integrated optical component of item 12 to item 15, wherein the third prism surface is adjacent a notch in the riser, the notch having a first notch surface parallel to the tread and a second notch surface adjacent the second prism surface and parallel to the riser.

Item 17 is the integrated optical component of item 12 to item 16, wherein the tread and the riser of each stair step intersect at a 90 degree angle.

Item 18 is the integrated optical component of item 12 to item 17, wherein the tread of each stair step is disposed at a 45 degree angle to the planar first surface.

Item 19 is the integrated optical component of item 12 to item 18, wherein at least one of the support, the first prism, and the second prism comprises a heat stabilized acrylic.

Item 20 is the integrated optical component of item 19, wherein the heat stabilized acrylic has a retardance of less than 20 nm.

Item 21 is the integrated optical component of item 12 to item 20, wherein the first prism surface is a back black coated surface, the second prism surface is a polished light input surface, the third prism surface is a polished output surface, and the fourth prism surface comprises a polished aperture suitable for a liquid crystal on silicon (LCoS) imager.

Item 22 is the integrated optical component of item 12 to item 21, wherein the reflective polarizer is adhered between the first prism and the second prism using a radiation cured adhesive.

Item 23 is the integrated optical component of item 22, wherein the radiation cured adhesive is cured by ultraviolet radiation.

Item 24 is an integrated optical component, comprising: a support having a planar first surface and an opposing second surface comprising a stair step having a tread and a riser; a plurality of polarizing beam splitter (PBS) cubes integral with the support and disposed in a line on the stair step, each of the plurality of PBS cubes comprising: a first prism having a first prism surface adjacent the riser and a second prism surface adjacent the stair step; a second prism having a third prism surface opposite the first surface and a fourth prism surface opposite the second surface; a reflective polarizer disposed on a diagonal surface between the first prism and the second prism, the reflective polarizer being parallel to the planar first surface of the support; and opposing end faces, each opposing end face orthogonal to the reflective polarizer, wherein each first prism surface is separated by a first trough from the riser, and a second trough separates adjacent PBS cubes on the riser.

Item 25 is the integrated optical component of item 24, wherein each second prism surface is separated from the adjacent tread by a prism extension.

Item 26 is the integrated optical component of item 24 or item 25, further comprising a black coating disposed on at least one of the first prism surface, the third prism surface, the fourth prism surface, and the end face.

Item 27 is the integrated optical component of item 24 to item 26, wherein at least one of the first prism surface, the third prism surface, the fourth prism surface, and the end face, comprises a polished surface.

Item 28 is the integrated optical component of item 24 to item 27, wherein the third prism surface is adjacent a notch in the riser, the notch having a first notch surface parallel to the tread and a second notch surface adjacent the second prism surface and parallel to the riser.

Item 29 is the integrated optical component of item 24 to item 28, wherein the tread and the riser intersect at a 90 degree angle.

Item 30 is the integrated optical component of item 24 to item 29, wherein the tread is disposed at a 45 degree angle to the planar first surface.

Item 31 is the integrated optical component of item 24 to item 30, wherein at least one of the support, the first prism, and the second prism comprises a heat stabilized acrylic.

Item 32 is the integrated optical component of item 31, wherein the heat stabilized acrylic has a retardance of less than 20 nm.

Item 33 is the integrated optical component of item 24 to item 32, wherein the first prism surface is a back black coated surface, the second prism surface is a polished light input surface, the third prism surface is a polished output surface, and the fourth prism surface comprises a polished aperture suitable for a liquid crystal on silicon (LCoS) imager.

Item 34 is the integrated optical component of item 24 to item 33, wherein the reflective polarizer is adhered between the first prism and the second prism using a radiation cured adhesive.

Item 35 is the integrated optical component of item 34, wherein the radiation cured adhesive is cured by ultraviolet radiation.

Item 36 is a method of making an optical component, comprising: laminating a reflective polarizer between a first polymeric plate and a second polymeric plate, the first polymeric plate having a first outer surface and the second polymeric plate having an opposing second outer surface; milling a plurality of parallel first troughs in the second polymeric plate at a 45 degree angle to the reflective polarizer to a first bottom depth, each parallel first trough separating a stair step riser from a first prism surface of a polarizing beam splitter (PBS) cube; milling a plurality of parallel second troughs perpendicular to the first troughs thereby forming a plurality of stair step treads, each of the stair step treads coplanar with the first bottom depth and extending from a first riser to an adjacent second riser, wherein each second trough separates end faces of adjacent PBS cubes on the tread, and an intersection of the tread and the riser defines a first hinge proximate the first outer surface; optionally milling a plurality of parallel third troughs each having a third bottom, each parallel to the first troughs, each of the parallel third troughs being perpendicular to the corresponding stair step riser and forming a flange supporting the PBS cubes, the third bottom separated from the tread by a second hinge; and milling a plurality of notches parallel to the first troughs, each notch having a first notch surface parallel to the tread and a second notch surface parallel to and extending into the riser, wherein the first notch surface comprises a fourth prism surface opposite the tread and the second notch surface comprises a third prism surface opposite the first prism surface, wherein the milling steps can be performed in any order.

Item 37 is the method of item 36, further comprising polishing at least one of the first prism surface, the third prism surface, the fourth prism surface, and the end face.

Item 38 is the method of item 36 or item 37, further comprising coating at least one of the first prism surface, the third prism surface, the fourth prism surface, and the end face, with a black coating.

Item 39 is the method of item 36 to item 38, further comprising separating adjacent treads from each other along the first hinge, thereby forming a plurality of PBS cube linear arrays supported on the tread.

Item 40 is the method of item 36 to item 38, further comprising separating each flange along the second hinge, thereby forming a plurality of PBS cube linear arrays supported on the flange.

Item 41 is the method of item 39 or item 40, further comprising securing the PBS cube linear array in an embedding material or on an adhesive surface, and milling the first outer surface to a second prism surface.

Item 42 is the method of item 41, further comprising polishing the second prism surface.

Item 43 is the method of item 41, further comprising removing the embedding material or the adhesive surface, thereby singulating the individual PBS cubes.

Item 44 is the method of item 36 to item 43, wherein the first polymeric plate has a thickness greater than the second polymeric plate.

Item 45 is the method of item 36 to item 44, wherein the first polymeric plate has a thickness twice as large as the second polymeric plate.

Item 46 is the method of item 36 to item 45, wherein laminating the reflective polarizer between the first and second polymeric plates comprises coating an adhesive on each major surface of the reflective polarizer before laminating the first and second polymeric plates, and curing the adhesive.

Item 47 is the method of item 46, wherein curing the adhesive comprises ultraviolet radiation curing the adhesive.

Item 48 is the method of item 36 to item 47, wherein at least one of the first polymeric plate and the second polymeric plate comprises a heat stabilized acrylic.

Item 49 is the method of item 48, wherein the heat stabilized acrylic has a retardance of less than 20 nm.

Item 50 is the method of item 36 to item 49, wherein the first prism surface is a back black coated surface, the third prism surface is a polished output surface, and the fourth prism surface comprises a polished aperture suitable for a liquid crystal on silicon (LCoS) imager.

Item 51 is the method of item 41, wherein the second prism surface is a polished light input surface.

Item 52 is an optical article, comprising: a first transparent plate having a first major surface; a second transparent plate having a second major surface; a polymeric multilayer reflective polarizer affixed between the first major surface and the second major surface; and a first undercut trough having first opposing sides and a first bottom, extending through the first transparent plate and the polymeric multilayer reflective polarizer, wherein at least one of the first and second transparent plates exhibit low-birefringence.

Item 53 is the optical article of item 52, wherein both the first and the second transparent plates exhibit low-birefringence.

Item 54 is the optical article of item 52 or item 53, wherein the first bottom is disposed within the second transparent plate.

Item 55 is the optical article of item 52 to item 54, wherein the first opposing sides are parallel and the first bottom is perpendicular to each of the first opposing sides.

Item 56 is the optical article of item 52 to item 55, further comprising a second undercut trough parallel to the first undercut trough, the second undercut trough having second opposing sides and a second bottom, the second bottom oriented perpendicular to the first bottom.

Item 57 is the optical article of item 56, wherein the second opposing sides are parallel and the second bottom is perpendicular to each of the second opposing sides.

Item 58 is the optical article of item 56 or item 57, wherein the second bottom and the first bottom are separated by a hinge comprising a portion of the second low-birefringent plate.

Item 59 is the optical article of item 52 to item 58, wherein at least one of the first transparent plate and the second transparent plate includes an opposing major surface parallel to the polymeric multilayer reflective polarizer.

Item 60 is the optical article of item 52 to item 59, wherein at least one of the first transparent plate and the second transparent plate comprise a heat stabilized acrylic.

Item 61 is the optical article of item 60, wherein the heat stabilized acrylic has a retardance of less than 20 nm.

Item 62 is the optical article of item 52 to item 61, further comprising at least one side trough perpendicular to the first undercut trough, the at least one side trough having third opposing sides and a third bottom, the third bottom parallel to the first bottom.

Item 63 is the optical article of item 62, wherein the first trough, second trough, and two adjacent side troughs collectively define boundaries of a polarizing beam splitter.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of making an optical component, comprising:
laminating a reflective polarizer between a first polymeric plate and a second polymeric plate, the first polymeric plate having a first outer surface and the second polymeric plate having an opposing second outer surface;
milling a plurality of parallel first troughs in the second polymeric plate at a 45 degree angle to the reflective polarizer to a first bottom, each parallel first trough separating a stair step riser from a first prism surface of a polarizing beam splitter (PBS) cube;
milling a plurality of parallel second troughs perpendicular to the first troughs thereby forming a plurality of stair step treads, each of the stair step treads coplanar with the first bottom and extending from a first riser to an adjacent second riser, wherein each second trough separates end faces of adjacent PBS cubes on the tread, and an intersection of the tread and the riser defines a first hinge proximate the first outer surface;
optionally milling a plurality of parallel third troughs each having a third bottom, each parallel to the first troughs, each of the parallel third troughs being perpendicular to the corresponding stair step riser and forming a flange supporting the PBS cubes, the third bottom separated from the tread by a second hinge; and
milling a plurality of notches parallel to the first troughs, each notch having a first notch surface parallel to the tread and a second notch surface parallel to and extending into the riser, wherein the first notch surface comprises a fourth prism surface opposite the tread and the second notch surface comprises a third prism surface opposite the first prism surface,
wherein the milling steps can be performed in any order.

2. The method of claim 1, further comprising polishing at least one of the first prism surface, the third prism surface, the fourth prism surface, and the end face.

3. The method of claim 1, further comprising coating at least one of the first prism surface, the third prism surface, the fourth prism surface, and the end face, with a black coating.

4. The method of claim 1, further comprising separating adjacent treads from each other along the first hinge, thereby forming a plurality of PBS cube linear arrays supported on the tread.

5. The method of claim 1, further comprising separating each flange along the second hinge, thereby forming a plurality of PBS cube linear arrays supported on the flange.

6. The method of claim 4, further comprising securing the PBS cube linear array in an embedding material or on an adhesive surface, and milling the first outer surface to a second prism surface.

7. The method of claim 6, further comprising polishing the second prism surface.

8. The method of claim 7, further comprising removing the embedding material or the adhesive surface, thereby singulating the individual PBS cubes.

9. The method of claim 1, wherein the first polymeric plate has a thickness greater than the second polymeric plate.

10. The method of claim 1, wherein the first polymeric plate has a thickness twice as large as the second polymeric plate.

11. The method of claim 1, wherein laminating the reflective polarizer between the first and second polymeric plates comprises coating an adhesive on each major surface of the reflective polarizer before laminating the first and second polymeric plates, and curing the adhesive.

12. The method of claim 11, wherein curing the adhesive comprises ultraviolet radiation curing the adhesive.

13. The method of claim 1, wherein at least one of the first polymeric plate and the second polymeric plate comprise a heat stabilized acrylic.

14. The method of claim 13, wherein the heat stabilized acrylic has a retardance of less than 20 nm.

15. The method of claim 1, wherein the first prism surface is a back black coated surface, the third prism surface is a polished output surface, and the fourth prism surface comprises a polished aperture suitable for a liquid crystal on silicon (LCoS) imager.

16. The method of claim 6, wherein the second prism surface is a polished light input surface.

* * * * *

UNITED STATES PATENT AND TRADEMARK OFFICE
CERTIFICATE OF CORRECTION

PATENT NO. : 10,379,369 B2
APPLICATION NO. : 16/002382
DATED : August 13, 2019
INVENTOR(S) : Le et al.

Page 1 of 1

It is certified that error appears in the above-identified patent and that said Letters Patent is hereby corrected as shown below:

On the Title Page

<u>Item (62), Column 1 (Related U.S. Application Data)</u>
Line 2, Delete "PCT/US2014/069957" and insert -- PCT/US2014/069657 --, therefor.

In the Specification

<u>Column 3</u>
Line 30, Delete "FIG." and insert -- FIGS. --, therefor.

<u>Column 7</u>
Line 20, Delete "Briston," and insert -- Bristol, --, therefor.

<u>Column 13</u>
Line 2, Delete "methylaziridne)" and insert -- methylaziridine) --, therefor.

Signed and Sealed this
Seventeenth Day of March, 2020

Andrei Iancu
*Director of the United States Patent and Trademark Office*